United States Patent Office 3,435,994
Patented Apr. 1, 1969

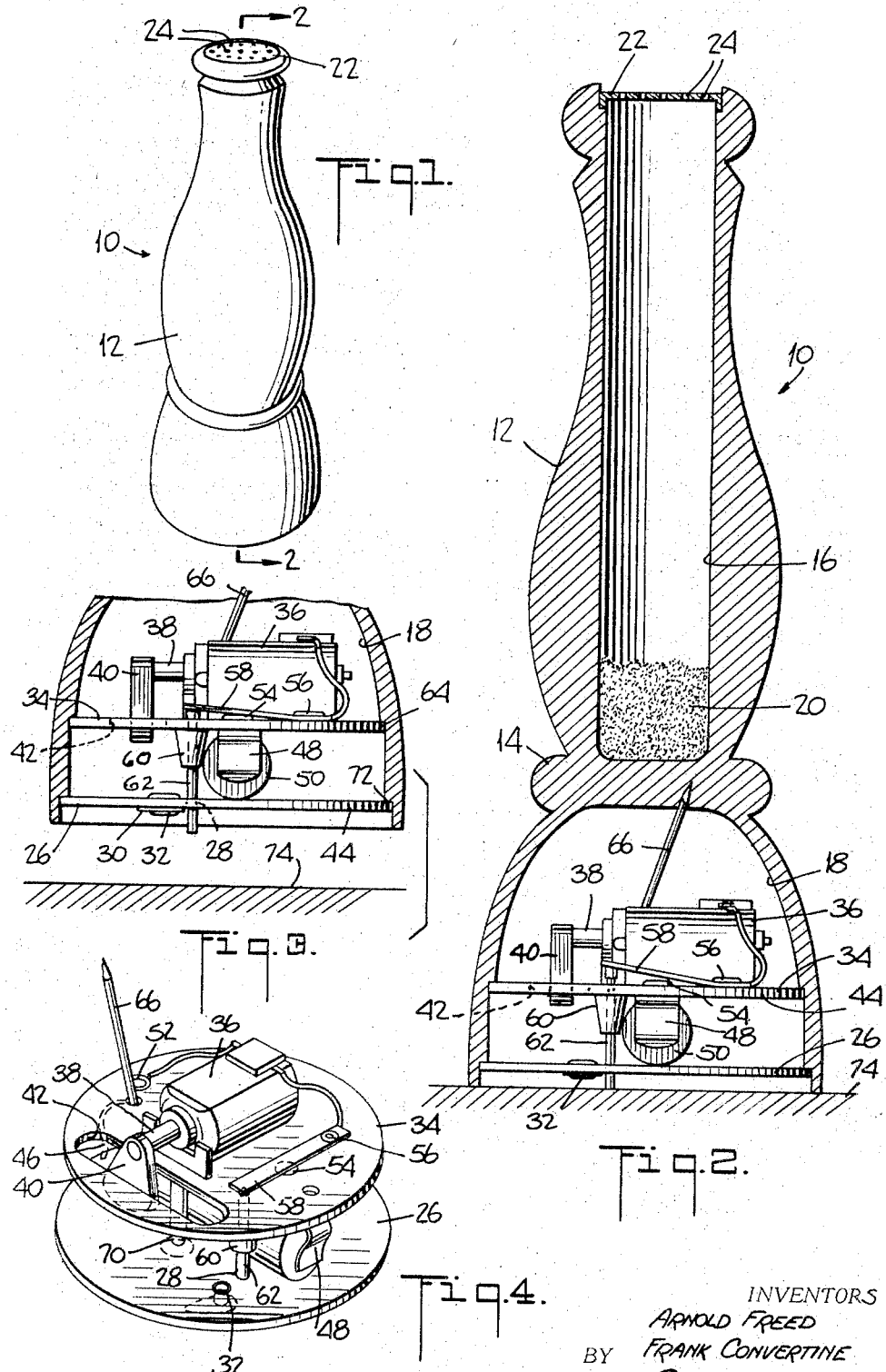

3,435,994
BATTERY OPERATED VIBRATING
DISPENSER
Arnold Frede, 166—40 Powells Cove Blvd., Whitestone, N.Y. 11357, and Frank Convertine, 24 Brightwater Place, Massepequa, N.Y. 11758
Filed May 16, 1968, Ser. No. 729,738
Int. Cl. B65g 65/70; B65d 47/00
U.S. Cl. 222—196   3 Claims

ABSTRACT OF THE DISCLOSURE

A vibrating dispenser comprising an upper chamber adapted to contain a granular condiment dispensable through a perforated cap, and a lower chamber provided with a battery-driven motor having a rotatable shaft on which is mounted an eccentric weight, with means within the chamber to close an electric circuit to activate the motor and rotate the shaft, and means extending from the dispenser to open the circuit.

---

This invention relates to the field of dispensing devices, and has for its objective the creation of a dispenser, for condiments such as salt, pepper and the like, which is selectively activated to vibrate, by the rotation of an eccentric weight disposed at the end of the shaft of a battery-driven motor, all disposed within the base of the dispenser, thereby causing the condiment to be dispensed therefrom when the dispenser is tilted at a proper angle.

In the present state of the art there are numerous forms of dispensing devices for condiments, such as salt, sugar, pepper, herbs and the like, which are provided with perforated caps, through which the contents are dispensed by inverting the dispenser and manually shaking it so that a portion of the contents drops out through the perforations, as required.

There are also to be found numerous forms of dispensing devices, such as for seeds and grain, which employ a form of electrically-induced vibration to dispense their contents, the vibration being created by oscillation of a vibrating plate alternately attracted magnetically to a motor, as is well known in the art.

No prior art has been found, however, which employs rotation of an eccentric weight, secured to the terminal end of a motor shaft, to create the vibratory and oscillatory motion provided by the present invention.

It is therefore the principal object of our invention to provide a vibrating dispenser, for condiments, such as salt and the like, which can be selectively activated to cause sufficient vibration to the dispenser to dispense a selected quantity of its contents through perforations in its cap, when the dispenser is tilted at an angle from the vertical.

A second important object of our invention lies in the provision of a vibrating dispenser whose vibration is caused by the rotation of an eccentric weight on the free end of a battery-driven motor shaft, all of which is concealed within the dispenser.

A third important object of our invention lies in the creation of a vibrating dispenser which remains inactive when placed upon a flat surface, but becomes activated when raised therefrom.

A fourth important object of our invention lies in the provision of a vibrating dispenser provided with means to prevent its activation, when so desired, regardless of the position in which it is placed.

Still another important object of our invention lies in the creation of a vibrating dispenser which is inexpensive to manufacture and simple to operate.

These and other salient objects, advantages and functional features of our invention, together with the novel features of construction, composition and arrangement of parts, will be more readily apparent from an examination of the following description, taken with the accompanying drawings, wherein:

FIG. 1 is a side perspective view of a preferred embodiment of our invention, same constituting a salt dispenser;

FIG. 2 is an enlarged cross-sectional view, taken on lines 2—2 of FIG. 1, showing its disposition on a flat surface;

FIG. 3 is a cross-sectional view of the lower portion of the dispenser shown by FIG. 2, raised from the flat surface; and FIG. 4 is a top perspective view of the activating elements of the dispenser.

Similar reference characters designate similar parts throughout the different views.

Illustrative of the embodiment shown by the drawings, our vibrating dispenser 10 comprises a receptacle or housing 12, intermediately separated by a divider 14 to define a hollow upper chamber 16 and a hollow lower chamber 18. Both of the chambers 16 and 18 are outwardly contoured as shown, both for aesthetic appearance and also for practical use, the former to contain a quanity of salt granules 20 for dispensation, and the latter to house the activating elements, which will be hereinafter described. The open end of the upper chamber 16 is provided with a closure cap 22 having a plurality of dispensing perforations 24, as shown in FIGS. 1 and 2. The open base of the lower chamber 18 is provided with a closure plate 26, having an eccentric opening 28 therein, for purposes to be hereafter disclosed. Adjacent the opening 28 the lower surface of the plate 26 is provided with a detent 30 which is rotatably secured thereto by a grommet 32, and adapted to cover the opening 28, when desired.

Within the chamber 18 is disposed a support disc 34 on which is mounted a small motor 36, provided with a shaft 38, to the free end of which is attached an eccentric weight 40. The disc 34 is provided with a cut-out slot 42 directly below the weight 40, so that the latter is enabled to rotate freely when the motor 36 is activated. To the undersurface 44 of the disc 34 are secured a pair of conductive brackets 46 and 48, adapted to secure a battery 50 between them, the bracket 46 being secured by means of a conductive grommet 52, and the bracket 48 by a similar grommet 54. A third conductive grommet 56 is secured to the support disc 34 adjacent the grommet 54. Grommet 52 is wired to one terminal of the motor 36, while grommet 56 is wired to the other terminal. A spring steel contact arm 58 is secured to the grommet 56 and adapted to lie across the grommet 54 so as to make electrical contact between them when at rest.

Integral with its undersurface 44 the disc 34 is provided with an integral hollow sleeve 60 opening through the disc 34, and a headed actuating pin 62 is disposed therethrough and freely vertically movable therein, so that, when raised by pressure against its lower end, the pin 62 will raise the contact arm 58 and dislodge it from engagement against the grommet 54.

The lower chamber 18 is provided with a peripheral ridge 64 against which the support disc 34 is adapted to abut, and to which it is secured by means of a stud 66 passing through the disc 34 and entering into the divider 14, as shown.

The undersurface 44 of the disc 34 is further provided with a second integral sleeve 68 which is threaded, and by means of which the closure plate 26 is secured to the disc 34 by a screw 70 passing through the plate 26 and threaded into the sleeve 68, thereby causing the plate 26 to abut a second peripheral ridge 72 in the wall of the lower chamber 18, thus closing off the chamber 18, with the activating pin 62 protruding through the opening 28, as shown by FIGS. 2, 3 and 4, the closure plate 26 being thus recessed slightly above the lower edge of the housing 12.

In the operation of our dispenser 10, the upper chamber 16 is filled with salt 20 and the cap 22 secured in place. The dispenser 10 is then placed, usually, upon a flat surface 74, such as a table. In this position the activating pin 62 is forced upward to dislodge the contact arm 58 from engagement with the grommet 54, so that contact between the two is broken and the electrical circuit thereby open. When the dispenser 10 is lifted from the surface 74 the pin 62 is released and drops downwardly, permitting the contact arm 58 to close the circuit between grommets 54 and 56, whereupon the eccentric weight 40 is caused to rotate on its shaft 38 creating a constant vibration or oscillation for the dispenser, so that when the latter is tilted sufficiently salt granules 20 are caused to be shaken out of the dispenser 10 through the perforations 24. Vibration continues, even when the dispenser 10 is held vertically, and stops only when it is replaced on a flat surface 74, so that the pin 62 is again forced upwards to break the circuit between grommets 54 and 56.

However, when it is desired to store the dispenser 10 and to insure that it will remain inoperative until again required, the activating pin 62 is manually pressed into the chamber 18 until its free end clears the outer surface of the plate 26, and the detent 30 is rotated across the opening 28 to close it off and thereby retain the pin 62 within the chamber 18 and the contact arm 58 from engagement with the grommet 54.

It is to be noted that while the foregoing describes a salt dispenser, it is obvious that our invention may be employed for the dispensing of other kinds of material, such as sugar, pepper, spices, etc. All that would be required for modification for a specific content would be modification of the size of the cap perforations 24 to accommodate the specific content.

The above described embodiment is intended, therefore, solely by way of illustration and not of limitation, and various changes may be made in the construction, composition and arrangement of parts without limitation upon or departure from the spirit and scope of the invention or sacrificing any of the advantages thereof inherent therein, all of which are claimed.

Having described our invention, we claim:
1. A vibrating dispenser comprising
   a housing divided into an upper chamber and a lower chamber,
   a perforated cap secured to the open end of the upper chamber,
   a closure plate secured to the open end of the lower chamber,
   a support disc fixedly disposed within the lower chamber,
   a motor and a battery secured to the disc and in electrical engagement with each other,
   the motor provided with a rotatable shaft having an eccentric weight mounted thereon,
   means to open the circuit when the dispenser is placed upon a flat surface and
   means to close the circuit when the dispenser is raised therefrom.
2. A vibrating dispenser as described in claim 1, the circuit opening and closing means comprising a spring metal contact arm secured to one terminal in the circuit and overlying its connecting terminal,
   an activating pin vertically disposed through the disc and freely movable vertically therein, with the head of the activating pin adapted to come in registry with the undersurface of the free end of the contact arm, and the lower end of the activating pin freely extendable through an opening in the closure plate, whereby pressure against the extending portion of the activating pin raises the pin to dislodge the free end of the contact arm from contact with the connecting terminal to open the circuit, and whereby the removal of such pressure permits the reengagement of the free end of the contact arm with the connecting terminal to close the circuit.
3. A vibrating dispenser as described in claim 2, a detent mounted on the undersurface of the closure plate and rotatable thereon, the detent adapted to be moved across the opening in the closure plate to confine the activating pin within the dispenser.

References Cited

UNITED STATES PATENTS 2,609,123  9/1952  Goldsby _____ 222—161
3,259,272  7/1966  Larson _____ 222—196 X STANLEY H. TOLLBERG, *Primary Examiner.*